United States Patent [19]

Chatterji et al.

[11] Patent Number: 5,588,489
[45] Date of Patent: Dec. 31, 1996

[54] LIGHTWEIGHT WELL CEMENT COMPOSITIONS AND METHODS

[75] Inventors: Jiten Chatterji, Duncan; James E. Griffith, Loco; Patty L. Totten; Bobby J. King, both of Duncan, all of Okla.

[73] Assignee: Halliburton Company, Duncan, Okla.

[21] Appl. No.: 551,101

[22] Filed: Oct. 31, 1995

[51] Int. Cl.$^6$ .................................................. E21B 33/138
[52] U.S. Cl. ....................... 166/293; 166/292; 166/309; 106/790
[58] Field of Search ................................... 166/292, 293, 166/309; 106/789, 790, 791

[56] References Cited

U.S. PATENT DOCUMENTS

| | | | |
|---|---|---|---|
| 4,304,298 | 12/1981 | Sutton | 166/293 |
| 4,415,366 | 11/1983 | Copening | 166/293 X |
| 4,627,495 | 12/1986 | Harris et al. | 166/280 |
| 4,897,119 | 1/1990 | Clarke . | |
| 5,058,679 | 10/1991 | Hale et al. | 166/293 |
| 5,086,850 | 2/1992 | Harris et al. | 175/61 |
| 5,147,565 | 9/1992 | Bour et al. | 166/293 X |
| 5,298,069 | 3/1994 | King et al. | 106/686 |
| 5,339,209 | 8/1994 | Harris et al. | 166/293 |
| 5,346,012 | 9/1994 | Heathman et al. | 166/293 |
| 5,355,954 | 10/1994 | Onan et al. | 166/293 X |
| 5,358,047 | 10/1994 | Himes et al. | 166/280 |
| 5,484,019 | 1/1996 | Griffith | 166/293 |

*Primary Examiner*—George A. Suchfield
*Attorney, Agent, or Firm*—Craig W. Roddy; C. Clark Dougherty, Jr.

[57] ABSTRACT

The present invention provides lightweight, fast setting cement compositions and methods which can be utilized in performing a variety of well cementing operations. The cement compositions are basically comprised of slag cement, water sufficient to form a pumpable slurry, a gas sufficient to foam the slurry and a foaming agent.

36 Claims, No Drawings

LIGHTWEIGHT WELL CEMENT COMPOSITIONS AND METHODS

BACKGROUND OF THE INVENTION

1. Field of the Invention

The present invention relates to lightweight well cement compositions and methods, and more particularly, but not by way of limitation, to such compositions and methods for performing completion and remedial operations in wells.

2. Description of the Prior Art

Hydraulic cement compositions are commonly utilized in oil, gas and water well completion and remedial operations. For example, hydraulic cement compositions are used in primary cementing operations whereby pipe such as casing is cemented in a well bore. In performing primary cementing, a hydraulic cement composition is pumped into the annular space between the walls of the well bore and the exterior of a pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

The cement composition utilized in primary cementing must often be lightweight to prevent excessive hydrostatic pressures from being exerted on formations penetrated by the well bore. Many lightweight cement slurries utilize water to reduce density; however, excessive water contributes to numerous undesirable slurry properties like solids settling, free water and low compressive strength. Solids settling within the cement slurry column results in nonuniformity of slurry density with accompanying free water. Lightweight additives like bentonite, sodium meta silicate, and the like control the free water, but do nothing to contribute to compressive strength development.

In carrying out completion and remedial cementing operations, the typical cement compositions utilized must have adequate pumping times before placement and short set times after placement. If a cement composition is slow to set, pressurized formation fluids can flow into and through the annulus before and after the cement composition sets. Such an occurrence is attributable to the inability of the cement composition to transmit hydrostatic pressure during the transition time of the cement composition, i.e., the time during which the cement composition changes from a true fluid to a hard set mass.

During the transition time of a cement composition, initial hydration of the cement composition has begun and the slurry starts to develop static gel strength. While the cement composition has little or no compressive strength, it becomes partially self-supporting which lowers the hydrostatic pressure exerted by the composition on pressurized fluid containing formations penetrated by the well bore. When the cement composition becomes partially self-supporting due to the development of gel strength prior to setting, volume reductions in the cement composition caused by hydration and fluid loss result in rapid decreases in the hydrostatic pressure exerted by the cement composition. The fluid phase within the cement matrix is not compressible and thus when the pressure exerted by the cement composition falls below the pressure of formation fluids, the formation fluids enter the annulus and flow through the cement composition forming undesirable flow passages which remain after the cement composition sets. If the formation fluids that flow through the cement composition include water which dilutes the composition, the ability of the composition to subsequently develop sufficient compressive strength and provide a competent seal can be reduced. The use of a highly compressible phase, like gas, in the cement composition improves the composition's ability to maintain pressure and thus prevent the flow of formation fluids into and/or through the composition.

The cementing problems mentioned above are aggravated in wells which are completed in deep water or in deep continental basins. In deep water or deep basins, casings must be cemented in well bores at locations sometimes many thousands of feet below the surface of the sea or land. Thus, the cement compositions utilized must remain fluid to allow adequate placement time without gaining substantial gel strength. After placement, the cement compositions must quickly develop gel strength and set, i.e., they must have short transition times in order to prevent pressurized formation fluids from entering the annulus or be capable of compensating for the cement compositions volume reduction by use of a compressible gas phase in the composition.

While cementing compositions and methods have been developed which have improved the success rate of well cementing operations, there is still a need for improved lightweight, fast setting, high compressive strength well cement compositions which are compressible and methods of using such compositions.

SUMMARY OF THE INVENTION

The present invention provides improved lightweight, fast setting well cement compositions and methods which meet the needs described above and overcome the shortcomings of the prior art. The cement compositions are basically comprised of slag cement, water or a water base fluid substitute for water present in the composition in an amount sufficient to form a pumpable slurry, a gas present in the composition in an amount sufficient to foam the slurry and produce a slurry density in the range of from about 6 to about 16 pounds per gallon and a foaming agent.

The methods of the present invention basically comprise placing a lightweight, fast setting compressible cement composition of this invention in a zone in a well to be cemented and maintaining the cement composition in the zone for a time sufficient for the cement composition to set into a high strength substantially impermeable mass therein.

It is, therefore, a general object of the present invention to provide improved well cementing compositions and methods of using the compositions in performing well completion and remedial operations.

Other and further objects, features and advantages of the present invention will be readily apparent to those skilled in the art upon a reading of the description of preferred embodiments which follows.

DESCRIPTION OF PREFERRED EMBODIMENTS

The present invention provides compressible, lightweight, fast setting well cement compositions which set into high compressive strength substantially impermeable masses and methods of using such compositions in well completion and remedial operations. The compositions and methods are suitable for cementing in wells exhibiting a need for lightweight or lower density cement compositions which are capable of preventing pressurized formation liquid and/or gas influx into the cement compositions when setting. The cement compositions and methods are particularly suitable for carrying out primary cementing operations in deep wells as a result of the cement compositions being lightweight, having low fluid loss, having short transition times, being compressible and having good thermal insulation properties.

As will be described hereinbelow, the cement compositions of this invention are foamed with a gas and consequently have relatively low densities, i.e., densities in the range of from about 6 to about 16 pounds per gallon. Also, as a result of being foamed, the cement compositions of this invention have excellent fluid loss control, i.e., an API fluid loss of less than about 100 cc in 30 minutes. Conventional cement slurries utilized heretofore often exceed 700 cc fluid loss in 30 minutes.

A further advantage of the cement compositions of this invention when used in primary cementing is that as a result of being foamed, the compositions are compressible. That is, when placed in an annulus to be cemented, a cement composition of this invention is compressed at a pressure above the pressure at which formation fluids flow into the annulus thereby increasing the resistance of the cement composition to formation fluid flow during its transition time. This characteristic is due to the compressed gas expanding to compensate for the cement compositions hydration and fluid loss volume reduction during setting. With the same reduction in volume, a non-compressible cement composition will greatly reduce in pressure where a compressible cement composition will remain at a relatively constant pressure until the cement composition sets thereby preventing water and/or gas from entering the annulus and flowing through the setting cement.

Another advantage of the cement compositions of the present invention is that as a result of being foamed, the compositions provide excellent thermal insulation between the well bore and a pipe cemented therein. A non-foamed cement composition typically has a thermal conductivity of 0.35 BTU/(hr*ft*degF) where a foamed cement composition of the same density has a thermal conductivity of 0.15 BTU/(hr*ft*degF). The applications of cement compositions that have low thermal conductivity include, but are not limited to, wells under steam injection or wells penetrating a perma-frost layer or gas-hydrate formation.

Yet another advantage of a foamed cement composition is that after setting, the dispersed gas in the set cement increases the ductility of the set cement as compared to non-foamed cements. Foamed cements have a Young's modulus of about $0.02 \times 10^6$ psi as compared to non-porous cements having a Young's modulus of about $2.5 \times 10^6$ psi.

The cement compositions of this invention are basically comprised of a hydraulic slag cement, water or a water base fluid substitute for water present in an amount sufficient to form a pumpable slurry, a gas present in an amount sufficient to foam the slurry and produce a slurry density in the range of from about 6 to about 16 pounds per gallon, a foaming agent to facilitate foaming of the cement composition and, optionally, a foam stabilizing agent to maintain the cement composition in the foamed state during placement and setting.

The slag cement useful herein is comprised of particulate slag, an activator such as lime and other additives such as a dispersant. The particulate slag is a granulated blast furnace byproduct formed in the production of cast iron, and is broadly comprised of the oxidized impurities found in iron ore. During the operation of a blast furnace to remove iron from iron ore, a molten waste product is formed. By preventing the molten product from crystallizing and thereby losing its energy of crystallization, a super cooled liquid or non-crystalline glassy material can be formed. The non-crystalline, glassy material, which has also been described as a vitreous substance free from crystalline materials as determined by X-ray diffraction analysis, is capable of exhibiting some hydraulic activity upon being reduced in size by grinding to a fine particle size in the range of from about 1 to about 100 microns.

Crystallization of the molten blast-furnace waste product is prevented and the super cooled glassy liquid is formed by rapidly chilling the molten waste. This rapid chilling can be affected by spraying the molten waste with streams of water which causes rapid solidification and the formation of a water slurry of small sand-like particles. The water is removed from the slurry and the remaining coarse particles are ground to a fine particle size having a Blaine fineness in the range of from about 5,000 to about 7,000, most preferably from about 5,200 to about 6,000 square centimeters per gram.

One or more activators are added to the slag which provide hydraulic activity to the slag at lower temperatures. Such activators include hydrated lime, $Ca(OH)_2$, sodium hydroxide, sodium sulfate, sodium carbonate, sodium silicate and Portland cement. The activator or activators used are combined with the particulate slag in an amount in the range of from about 0.5% to about 10% by weight of the slag.

A preferred slag cement for use in accordance with the present invention is comprised of particulate slag having a Blaine fineness of about 5,900 square centimeters per gram, sodium carbonate present in an amount of about 2% by weight of particulate slag and a dispersant present in an amount of about 1.4% by weight of slag. Such a slag cement is commercially available under the trade designation "NEWCEM™" from Blue Circle Atlantic Company of Ravena, N.Y. or "AUCEM™" from Lonestar Industries, Inc. of New Orleans, La.

The water used in the cement compositions of this invention can be water from any source provided it does not contain an excess of compounds which adversely react with or otherwise affect other components in the cement compositions. For example, the water can be fresh water, salt water, brines or seawater. Also, any available water base fluid which does not adversely react with components in the cement composition can be substituted for the water. For example, a water base well drilling fluid available at the well cite may be utilized either alone or in combination with water. In offshore applications, it is convenient to utilize seawater for forming the cement compositions. The water used is present in a cement composition of this invention in an amount sufficient to form a pumpable slurry of the slag cement. Generally, the water is present in the range of from about 20% to about 180% by weight of the slag cement in the composition.

The gas used to foam the cement slurry is preferably nitrogen or air, with nitrogen being the most preferred. Generally, the gas is present in an amount sufficient to foam the cement slurry and produce a slurry density in the range of from about 6 to about 16 pounds per gallon, i.e., an amount in the range of from about 5% to about 75% by volume of the resulting foamed composition.

In order to facilitate foaming and to stabilize the foamed slurry, a foaming agent is preferably included in the cement composition. Suitable foaming agents are surfactants having the general formula:

$$H(CH_2)_a(OC_2H_4)_bOSO_3X^+$$

wherein:
a is an integer in the range of from about 5 to about 15;
b is an integer in the range of from about 1 to about 10; and
X is any compatible cation.

A particularly preferred foaming agent is a surfactant of the above type having the formula:

$$H(CH_2)_a(OC_2H_4)_3OSO_3Na^+$$

wherein:
a is an integer in the range of from about 6 to about 10.

This surfactant is commercially available from Halliburton Energy Services of Duncan, Okla., under the trade designation "CFA-S™."

Another particularly preferred foaming agent of the above mentioned type is a surfactant having the formula:

$$H(CH_2)_a(OC_2H_4)_bOSO_3NH_4^+$$

wherein:
a is an integer in the range of from about 5 to about 15; and
b is an integer in the range of from about 1 to about 10.

This surfactant is available from Halliburton Energy Services under the trade name "HALLIBURTON FOAM ADDITIVE™."

Another foaming agent which can be utilized in the cement compositions of this invention include polyethoxylated alcohols having the formula:

$$H(CH_2)_a(OC_2H_4)_bOH$$

wherein:
a is an integer in the range of from about 10 to about 18; and
b is an integer in the range of from about 6 to about 15.

This surfactant is available from Halliburton Energy Services under the trade name "AQF-1™."

Yet another foaming agent which can be used is a sodium salt of alpha-olefinic sulfonic acid (AOS) which is a mixture of compounds of the formulas:

$$X[H(CH_2)_n\text{---}C\text{=}C\text{---}(CH_2)_mSO_3Na^+]$$

and $$Y[H(CH_2)_p\text{---}COH\text{---}(CH_2)_qSO_3Na^+]$$

wherein:
n and m are individually integers in the range of from about 6 to about 16;
p and q are individually integers in the range of from about 7 to about 17; and
X and Y are fractions and the sum of X and Y is 1.

This surfactant is available from Halliburton Energy Services under the trade name "AQF-2™."

Still another surfactant which can be used is an alcohol ether sulfate of the formula:

$$H(CH_2)_a(OC_2H_4)_bSO_3NH_4^+$$

wherein:
a is an integer in the range of from about 6 to about 10; and
b is an integer in the range of from about 3 to about 10.

This foaming agent is available from Halliburton Energy Services under the trade name "HOWCO-SUDS™".

The particular foaming agent employed will depend on various factors such as the types of formations in which the foamed cement is to be placed, etc. Generally, the foaming agent utilized is included in a cement composition of this invention in an amount in the range of from about 0.5% to about 10% by weight of water in the composition. When the foaming agent is one of the preferred surfactants described above, it is included in the composition in an amount in the range of from about 2% to about 4% by weight of water therein.

A foam stabilizing agent can also be included in the foamed cement compositions of this invention to enhance the stability of the foamed cement slurry. One such foam stabilizing agent is a compound of the formula:

$$\begin{array}{c} R \\ | \\ CH_3O(CH_2CHO)_n\text{---}R \end{array}$$

wherein:
R is hydrogen or a methyl radical; and
n is an integer in the range of from about 20 to about 200.

A particularly preferred foam stabilizing agent of the above type is a methoxypolyethylene glycol of the formula:

$$CH_3O(CH_2CH_2O)_nH$$

wherein:
n is in the range of from about 100 to about 150.

This foam stabilizing agent is commercially available from Halliburton Energy Services under the trade designation "HALLIBURTON FOAM STABILIZER™."

The preferred foam stabilizing agent is a compound having the formula:

$$R\text{---}CONHCH_2CH_2CH_2N^+(CH_3)_2CH_2CO_2^-$$

wherein:
R is a $C_{10}$ to $C_{18}$ saturated aliphatic hydrocarbon group or an oleyl group or a linoleyl group.

A particularly preferred stabilizing agent of the above type is an amidopropylbetaine of the formula:

$$R\text{---}CONHCH_2CH_2CH_2N^+(CH_3)_2CH_2CO_2^-$$

wherein:
R is a coco radical.

This foam stabilizing agent is commercially available from Halliburton Energy Services under the trade designation "HC-2™."

When a foam stabilizing agent is utilized, it is included in a cement composition of this invention in an amount in the range of from about 0.25% to about 5% by weight of water utilized. When the foam stabilizing agent is one of the particularly preferred agents described above, it is preferably present in the composition in an amount in the range of from about 1% to about 2% by weight of water.

A particularly preferred lightweight fast setting well cement composition of this invention which sets into a high compressive strength substantially impermeable mass is comprised of slag cement; water present in an amount sufficient to form a pumpable slurry; nitrogen gas present in an amount in the range of from about 5% to about 75% by volume of the cement composition to produce a density in the range of from about 6 to about 16 pounds per gallon; a foaming agent comprised of the sodium salt of alpha-olefinic sulfonic acid present in an amount in the range of from about 2% to about 4% by weight of water in the composition; and a foam stabilizing agent comprised of an amidopropylbetaine of the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group,
the foam stabilizer being present in an amount in the range of from about 1% to about 2% by weight of water in the composition.

As will be understood by those skilled in the art, the cement compositions of this invention can include a variety of known additives for achieving desired properties and results such as set retarding additives, fluid loss control additives, weighting additives and the like.

In forming the cement compositions of this invention, the slag cement, and any other dry additives used are preferably first blended together followed by mixing with the water used to form a pumpable slurry. As the slurry is pumped to the well bore, the foaming agent and foam stabilizing agent (if used) followed by the nitrogen or air are preferably injected into the slurry on the fly. As the slurry and gas flow to the cement composition placement location in the well, the cement composition is foamed and stabilized.

The methods of this invention for cementing a zone in a well basically comprise the steps of placing a lightweight fast setting well cement composition of this invention which sets into a high strength substantially impermeable mass in the subterranean zone to be cemented, and maintaining the cement composition in the zone for a time sufficient for the cement composition to set therein.

In order to further illustrate the compositions and methods of this invention, the following examples are given.

EXAMPLE 1

Test samples of the foamed cement compositions of this invention were prepared utilizing particulate slag having a Blaine fineness of about 5,900 square centimeters per gram; saturated salt water, fresh water or seawater; various activators; various foaming agents and a foam stabilizer; all as described in Table I below.

The procedure utilized in preparing each of the test samples was as follows. A base unfoamed cement slurry excluding foaming agent and foam stabilizing agent was first prepared by mixing the particulate slag with the dispersant used, the activator used and the water used. A predetermined amount of the resulting slurry was then placed in a fixed volume blender jar having a stacked blade assembly. The foaming agent and foam stabilizing agent used were then added to the jar and the contents were mixed at high speed for a period of time of about 20 seconds. The high speed mixing by the stacked blade assembly caused the slurry to be foamed with air.

Each of the test samples were tested for rheology and 24 hr. compressive strength at 80° F. in accordance with the procedures set forth in the *API Specification For Materials And Testing For Well Cements,* API Specification 10, Fifth Edition, dated Jul. 1, 1990, of the American Petroleum Institute which is incorporated herein by reference. The results of the rheology and compressive strength tests are set forth in Table II below.

TABLE I

Foamed Slag Cement Composition Test Samples[1]

| Sample No. | Quantity Of Dispersant[2] Used, ppb | Quantity Of Activator[3] Used, ppb | Water Used | Unfoamed Composition Density, ppg | Foamed Composition Density, ppg | Quantity Of Foaming Agent[4] Used, % By Vol. of Water | Quantity Of Foam Stabilizing Agent[5] Used, % By Vol. Of Water |
|---|---|---|---|---|---|---|---|
| 1 | 1 | None | saturated salt water | 15 | 12 | 2 | 1 |
| 2 | 1 | 10 | saturated salt water | 15 | 12 | 2 | 1 |
| 3 | 5 | 10 | saturated salt water | 13 | 10.5 | 2 | 1 |
| 4 | 1 | 10 | saturated salt water | 15 | 12 | 2 | 1 |
| 5 | 1 | 10 | saturated salt water | 15 | 12 | 2 | 1 |
| 6 | 7 | 10 | saturated salt water | 17 | 12 | 2 | 1 |
| 7 | 1 | 5 | saturated salt water | 15 | 12 | 2 | 1 |
| 8 | 3 | 10 | fresh water | 13 | 10.5 | 2 | 1 |
| 9 | 1 | 10 | fresh water | 15 | 12 | 2 | 1 |
| 10 | None | 10 | fresh water | 15 | 12 | 2 | 1 |
| 11 | None | None | fresh water | 15 | 12 | 2 | 1 |
| 12 | None | 10 | sea water | 14.7 | 11 | 4 | 2 |
| 13 | None | None | sea water | 14.7 | 10.5 | 2 | 1 |

TABLE I-continued

Foamed Slag Cement Composition Test Samples[1]

| Sample No. | Quantity Of Dispersant[2] Used, ppb | Quantity Of Activator[3] Used, ppb | Water Used | Unfoamed Composition Density, ppg | Foamed Composition Density, ppg | Quantity Of Foaming Agent[4] Used, % By Vol. of Water | Quantity Of Foam Stabilizing Agent[5] Used, % By Vol. Of Water |
|---|---|---|---|---|---|---|---|

[1] The particulate slag used in all samples had a Blaine fineness of about 5,900 cm²/gm.
[2] The fluid loss control additive used in Samples Nos. 1–5 and 7–8 was a dispersant commercially available from Baroid Drilling Fluids Company of Houston, Texas under the trade designation "PAC-L ™." The dispersant used in Samples Nos. 6 and 9 was a dispersant commercially available from Fritz Chemical Company of Dallas, Texas under the trade designation "SUPERCIZER 7 ™."
[3] The activator used in Samples Nos. 2, 9 and 12 was Ca(OH)$_2$ and the activator used in Samples Nos. 3–8 and 10 was Na$_2$CO$_3$.
[4] The foaming agent used in Samples Nos. 1–7 was the above described foaming agent commercially available from Halliburton Energy Services under the trade designation "CFA-S ™." The foaming agent used in Samples Nos. 8–13 was the above described foaming agent commercially available from Halliburton Energy Services under the trade designation "AQF-2 ™."
[5] The foam stabilizing agent used was the above described foam stabilizing agent commercially available from Halliburton Energy Services under the trade designation "HC-2 ™."

TABLE 2

Rheology And Compressive Strength Test Results

| Sample No. | Rheology, rpm | | | | | | 24 Hr. Compressive Strength, psi |
|---|---|---|---|---|---|---|---|
| | 600 | 300 | 200 | 100 | 6 | 3 | |
| 1 | 300+ | 298 | 262 | 160 | 23 | 17 | Not Set |
| 2 | 105 | 60 | 14 | 24 | 5 | 3 | — |
| 3 | 300+ | 300+ | 273 | 165 | 17 | 11 | Not Set |
| 4 | 300+ | 215 | 162 | 97 | 18 | 16 | 687 |
| 5 | 253 | 146 | 109 | 63 | 13 | 12 | 507 |
| 6 | 580 | 366 | 280 | 184 | 48 | 40 | 1080 |
| 7 | 230 | 134 | 99 | 58 | 12 | 10 | 415 |
| 8 | 297 | 191 | 144 | 83 | 12 | 9 | 189 |
| 9 | 400 | 360 | 344 | 268 | 64 | 62 | 235 |
| 10 | 137 | 82 | 62 | 41 | 17 | 14 | 507 |
| 11 | 504 | 440 | 408 | 358 | 80 | 68 | 200 |
| 12 | — | — | — | — | — | — | 231 |
| 13 | — | — | — | — | — | — | 164 |

From Table II above it can be seen that the lightweight foamed slag cement compositions of this invention have excellent rheologies and compressive strengths and are particularly suitable for use in primary well cementing applications.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of cementing a zone in a well comprising the steps of:
   providing a cement composition consisting essentially of slag cement, water present in an amount sufficient to form a pumpable slurry, a gas present in an amount sufficient to foam said slurry and a foaming agent; and
   placing said cement composition in the zone.

2. The method of claim 1 wherein said slag cement has a Blaine fineness in the range of from about 5,000 to about 7,000 square centimeters per gram.

3. The method of claim 1 wherein said water is present in said composition in an amount in the range of from about 20% to about 180% by weight of slag cement in said composition.

4. The method of claim 1 wherein said gas is selected from the group consisting of nitrogen and air, and is present in said composition in an amount in the range of from about 5% to about 75% by volume of said composition.

5. The method of claim 1 wherein said slurry has a density in the range of from about 6 to about 16 pounds per gallon.

6. The method of claim 1 wherein said foaming agent comprises the sodium salt of alpha-olefinic sulfonic acid and is present in said composition in an amount in the range of from about 0.5% to about 10% by weight of water in said composition.

7. The method of claim 1 wherein said water is selected from the group consisting of fresh water, salt water, brines and seawater.

8. The method of claim 1 wherein said slag cement is comprised of particulate slag and an activator combined with the particulate slag in an amount in the range of from about 0.5% to about 10% by weight of the slag.

9. The method of claim 8 wherein said slag cement comprises a dispersant.

10. The method of claim 1 wherein said slag cement is comprised of particulate slag having a Blaine fineness of about 5,900 square centimeters per gram, an activator combined with the particulate slag in an amount in the range of from about 0.5% to about 10% by weight of the slag and a dispersant present in an amount of about 1.4% by weight of slag.

11. The method of claim 1 wherein said foaming agent is present in said composition in an amount in the range of from about 2% to about 4% by weight of water in said composition.

12. The method of claim 11 which further comprises a foam stabilizing agent is present in said composition in an amount in the range of from about 1% to about 2% by weight of water in said composition.

13. The method of claim 1 which further comprises a foam stabilizing agent comprised of an amidopropylbetaine of the formula:

$$R-CONHCH_2CH_2CH_2N^+(CH_3)_2CH_2CO_2^-$$

wherein:
   R is a $C_{10}$ to $C_{18}$ saturated aliphatic hydrocarbon group or an oleyl group or a linoleyl group,
   the foam stabilizer being present in an amount in the range of from about 0.25% to about 5% by weight of water in the composition.

14. A method of cementing a zone in a well comprising the steps of:

11 providing a cement composition comprising slag cement, water present in an amount sufficient to form a pumpable slurry, a gas present in an amount sufficient to foam said slurry and a foaming agent which comprises the sodium salt of alpha-olefinic sulfonic acid and is present in said composition in an amount in the range of from about 0.5% to about 10% by weight of water in said composition; and placing the well cement composition in said zone.

15. The method of claim 14 wherein said slag cement has a Blaine fineness in the range of from about 5,000 to about 7,000 square centimeters per gram.

16. The method of claim 14 wherein said water is present in said composition in an amount in the range of from about 20% to about 180% by weight of slag cement in said composition.

17. The method of claim 14 wherein said gas is selected from the group consisting of nitrogen and air, and is present in said composition in an amount in the range of from about 5% to about 75% by volume of said composition.

18. The method of claim 14 wherein said slurry has a density in the range of from about 6 to about 16 pounds per gallon.

19. The method of claim 14 wherein said water is selected from the group consisting of fresh water, salt water, brines and seawater.

20. The method of claim 14 wherein said slag cement is comprised of particulate slag and an activator combined with the particulate slag in an amount in the range of from about 0.5% to about 10% by weight of the slag.

21. The method of claim 20 wherein said slag cement comprises a dispersant.

22. The method of claim 14 wherein said slag cement is comprised of particulate slag having a Blaine fineness of about 5,900 square centimeters per gram, an activator combined with the particulate slag in an amount in the range of from about 0.5% to about 10% by weight of the slag and a dispersant present in an amount of about 1.4% by weight of slag.

23. The method of claim 14 wherein said foaming agent is present in said composition in an amount in the range of from about 2% to about 4% by weight of water in said composition.

24. The method of claim 14 which further comprises a foam stabilizing agent is present in said composition in an amount in the range of from about 1% to about 2% by weight of water in said composition.

25. The method of claim 14 which further comprises a foam stabilizing agent comprised of an amidopropylbetaine of the formula:

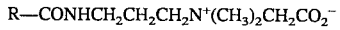

wherein:

R is a $C_{10}$ to $C_{18}$ saturated aliphatic hydrocarbon group or an oleyl group or a linoleyl group, the foam stabilizer being present in an amount in the range of from about 0.25% to about 5% by weight of water in the composition.

26. A method of cementing a zone in a well comprising the steps of:

12 providing a cement composition consisting essentially of:

slag cement comprised of particulate slag and an activator combined with the particulate slag in an amount in the range of from about 0.5% to about 10% by weight of the slag, water present in an amount sufficient to form a pumpable slurry, a gas present in an amount sufficient to foam said slurry and produce a slurry density in the range of from about 6 to about 16 pounds per gallon, and a foaming agent; and placing said cement composition in the zone.

27. The method of claim 26 wherein said slag cement has a Blaine fineness in the range of from about 5,000 to about 7,000 square centimeters per gram.

28. The method of claim 26 wherein said water is present in said composition in an amount in the range of from about 20% to about 180% by weight of slag cement in said composition.

29. The method of claim 26 wherein said gas is selected from the group consisting of nitrogen and air, and is present in said composition in an amount in the range of from about 5% to about 75% by volume of said composition.

30. The method of claim 26 wherein said foaming agent comprises the sodium salt of alpha-olefinic sulfonic acid and is present in said composition in an amount in the range of from about 0.5% to about 10% by weight of water in said composition.

31. The method of claim 26 wherein said water is selected from the group consisting of fresh water, salt water, brines and seawater.

32. The method of claim 26 wherein said slag cement comprises a dispersant.

33. The method of claim 26 wherein said slag cement is comprised of particulate slag having a Blaine fineness of about 5,900 square centimeters per gram and a dispersant present in an amount of about 1.4% by weight of slag.

34. The method of claim 26 wherein said foaming agent is present in said composition in an amount in the range of from about 2% to about 4% by weight of water in said composition.

35. The method of claim 34 which further comprises a foam stabilizing agent is present in said composition in an amount in the range of from about 1% to about 2% by weight of water in said composition.

36. The method of claim 26 which further comprises a foam stabilizing agent comprised of an amidopropylbetaine of the formula:

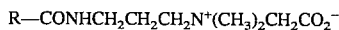

wherein:

R is a $C_{10}$ to $C_{18}$ saturated aliphatic hydrocarbon group or an oleyl group or a linoleyl group, the foam stabilizer being present in an amount in the range of from about 0.25% to about 5% by weight of water in the composition.

* * * * *